United States Patent
Li et al.

(10) Patent No.: US 8,831,558 B2
(45) Date of Patent: Sep. 9, 2014

(54) METHOD AND APPARATUS FOR INTER-SYSTEM RESELECTION FREQUENCY STATISTICS

(75) Inventors: Qun Li, Shenzhen (CN); Minghe Zhao, Shenzhen (CN)

(73) Assignee: ZTE Corporation (CN)

( * ) Notice: Subject to any disclaimer, the term of this patent is extended or adjusted under 35 U.S.C. 154(b) by 25 days.

(21) Appl. No.: 13/696,342

(22) PCT Filed: Apr. 19, 2011

(86) PCT No.: PCT/CN2011/073008
§ 371 (c)(1),
(2), (4) Date: Nov. 6, 2012

(87) PCT Pub. No.: WO2011/140886
PCT Pub. Date: Nov. 17, 2011

(65) Prior Publication Data
US 2013/0052986 A1 Feb. 28, 2013

(30) Foreign Application Priority Data
May 10, 2010 (CN) .......................... 2010 1 0169868

(51) Int. Cl.
*H04W 88/02* (2009.01)
*H04W 16/18* (2009.01)
*H04W 36/14* (2009.01)
*H04W 24/08* (2009.01)

(52) U.S. Cl.
CPC .............. *H04W 36/14* (2013.01); *H04W 16/18* (2013.01); *H04W 24/08* (2013.01)
USPC ....................................................... 455/405

(58) Field of Classification Search
USPC ........... 455/405, 403, 422.1, 435.1, 458, 466, 455/515, 518
See application file for complete search history.

(56) References Cited

U.S. PATENT DOCUMENTS 7,957,736 B1 * 6/2011 Haumont ................... 455/435.1
2007/0105527 A1 * 5/2007 Nylander et al. ............. 455/403

FOREIGN PATENT DOCUMENTS

| CN | 1874593 A | 12/2006 |
| CN | 101621809 A | 1/2010 |
| JP | 2008060662 A | 3/2008 |

OTHER PUBLICATIONS

International Search Report International Application No. PCT/CN2011/073008; International Application Filing Date Apr. 19, 2011; Mail date Jul. 28, 2011.

*Primary Examiner* — Diane Mizrahi
(74) *Attorney, Agent, or Firm* — Cantor Colburn LLP

(57) ABSTRACT

Disclosed in the present invention are a method and device for calculating statistics of inter-system reselection frequency, for realizing calculation and analysis of inter-system reselection frequency of dual-mode user equipment during the 3G network construction in the situation where the 2G and 3G networks are deployed as different location areas at the initial stage of network construction. In the present invention, in the situation where the 2G and 3G networks are deployed as different location areas at the initial stage of network construction, the data is collected based on the radio network control system, the location area or routing area update log of the UE is counted and analyzed, multi-dimensional classification is carried out by the signaling monitoring and analysis system at the network side, the distribution of inter-system reselection frequency of dual-mode user equipment during the 3G network construction is reflected in the sense of statistics, so as to direct the network area coverage layout and network convergence establishment planning and improve user experience.

14 Claims, 4 Drawing Sheets

METHOD AND APPARATUS FOR INTER-SYSTEM RESELECTION FREQUENCY STATISTICS

FIELD OF THE INVENTION

The present invention relates to the data collection and counting technology in the wireless communication system, and particularly to a method and device for calculating statistics of inter-system reselection frequency.

BACKGROUND OF THE INVENTION

With the issuance of the $3^{rd}$ generation mobile communication technology (3G) operating licenses in China, it is declared that the 3G has entered into the commercial stage. Compared to the $2^{nd}$ mobile communication technology (2G) network, the 3G network and equipment faces great challenge of commercial maturity at the initial stage of network construction. On one hand, the network configuration needs to be optimized, and the performance of the system equipment and user equipment (UE) at the network side needs be improved. On the other hand, the service usage experience, service serving experience and service charging experience of the user need to be improved from the view of user experience.

The TD-SCDMA network is dedicated to evaluate the network operation based on the network quality key performance indication (KPI) system since the commercialization of first stage city network construction from 2007. And the TD-SCDMA network continuously improves and optimizes the network equipment and network environment. However, while the network KPI is continuously improved, the user experience is not improved synchronously. The direct result is that there are more customer compliant and the increase of network traffic is slow.

The service usage experience of the user is the basis of user experience evaluation. It is an intuitive feeling of the user to the performance and quality of the product. If the real feeling is far away from what is expected, the user may give up using this product.

Compared to coverage of the 2G network, the 3G network coverage has some blind spots. The TD network needs to rely on the coverage advantages of the GSM network to improve coverage at the initial stage of network construction. Therefore, the interoperation technology of 3G and 2G networks is developed. to According to the demand, the dual-mode user equipment is adapted to support the user to smoothly interoperate between different 2G/3G networks. The interoperation mainly includes the two aspects of reselection and switch. Reselection can be deemed as a behavior of cell changing between systems in the idle state, and switch is a behavior of cell changing between systems in the connected state.

Currently, the TD-SCDMA/GSM interoperation mainly has the following problems: the reselection between the TD-SCDMA and GSM network systems is frequent, the reselection time is too long, and within the system reselection time, in most of this time the user cannot be reached; and currently tests have found that the reselection duration of TD-SCDMA and GSM is from 6 s to 10 s, and if in some imperfect terminals and networks, the reselection time may be much longer, even up to over 20 s; and this means that in this 6 s to 10 s, the user cannot be reached and the user cannot be called. According to the statistics of the test results, the user being unreachable caused by test and location area update constitutes over 20% of the total number of failed calls. That is, 20% of disconnection is caused by location update of the reselection or switch process of TD-SCDMA and GSM. Frequent reselection of TD-SCDMA and GSM will induce the terminal to crash or be out of service.

For the above problems, measurements such as network deployment, network convergence and so on are proposed. During network deployment, in order to reduce frequent inter-system interoperations, continuous coverage of hotspot areas should be realized as much as possible. Thus, the reselection problem caused by frequent inter-system switch of TD-SCDMA and GSM networks can be reduced. And, inter-system reselection frequency can be reduced by way of hotspot coverage and area coverage. The network convergence is realized by way of wireless network convergence, and the switch time can be saved using innovative interfaces, thereby improving user experience.

However, there is still no specific solution in the related art regarding how to analyze inter-system reselection frequency based on network data collection, so as to direct network area coverage deployment and network convergence construction planning and to improve user experience.

SUMMARY OF THE INVENTION

In view of this, the main object of the present invention is to provide a method and device for calculating statistics of inter-system reselection frequency. In the situation that the 2G and 3G networks are deployed as different location areas at the initial stage of network construction, the embodiments of the present invention can realize calculating statistics and analysis of inter-system reselection frequency of dual-mode user equipment in the 3G network construction.

In order to achieve the above object, the technical solution in the present invention is implemented as follows.

A method for calculating statistics of inter-system reselection frequency, comprising:

a radio network controller (RNC) collecting user logs of whole network users in which call process is a location area update and/or a routing area update process, wherein the user logs comprise at least: a call origination cell home location area identification (LAI) and corresponding location area update information and/or a call origination cell home routing area identification (RAI) and corresponding routing area update information, a call origination cell identification, a call origination time, and a user identification; wherein the location area update information carries a location area update type and an original LAI before update, and the routing area update information carries a routing area update type and an original RAI before update; and within a given time period, calculating times of inter-system reselection in a user log in which the location area update process is an inter-system LAI update and/or the routing area update process is an inter-system RAI update, so as to obtain a statistics value of the inter-system reselection frequency within the given time period.

Furthermore, the RNC supports decoding of a non-access-layer location area update message and/or a non-access-layer routing area update message.

Furthermore, the RNC only collects the user logs in which the location area update type is normal location area update type and/or the routing area update type is normal routing area update type.

Furthermore, when a user log contains the routing area update information and the location area update information simultaneously, the statistics value of the inter-system reselection frequency is calculated only based on the location area update information.

Furthermore, calculating the times of inter-system reselection in the user log in which the location area update process is the inter-system LAI update and/or the routing area update process is the inter-system RAI update comprises:

retrieving in an inter-system network format comparison table a system network format corresponding to the call origination cell home LAI in the user log and a system network format corresponding to the original LAI before update in the location area update information respectively; and if the two corresponding system network formats are different, accumulating the statistics value of the inter-system reselection frequency; and/or retrieving in the inter-system network format comparison table a system network format corresponding to the call origination cell home RAI in the user log and a system network format corresponding to the original RAI before update in the routing area update information respectively, and if the two corresponding system network formats are different, accumulating the statistics value of the inter-system reselection frequency.

Furthermore, the method further comprises:

calculating the statistics value of the inter-system reselection frequency within the given time period for each user, and generating a statistics result record for the each user; and if the statistics value of the inter-system reselection frequency within the given time period of a user exceeds a preset different alert threshold, providing a corresponding expert prompt in the statistics result record.

Furthermore, the method further comprises: carrying out multi-dimensional classification statistics calculation, according to key words of cell, cell group, terminal type, user group or time period, and based on both the user logs of the whole network users, collected by the RNC, in which the call process is the location area update and/or the routing area update process, and the statistics result record.

Based on the above method, a device for calculating statistics of inter-system reselection frequency is provided in the present invention, comprising:

a collection module, located in a radio network controller (RNC), configured to collect user logs of whole network users in which call process is a location area update and/or a routing area update process, wherein the user logs comprise at least: a call origination cell home location area identification (LAI) and corresponding location area update information and/or a call origination cell home routing area identification (RAI) and corresponding routing area update information, a call origination cell identification, a call origination time, and a user identification; wherein the location area update information carries a location area update type and an original LAI before update, and the routing area update information carries a routing area update type and an original RAI before update; and a frequency statistics module, configured to, within a given time period, calculate times of inter-system reselection in a user log in which the location area update process is an inter-system LAI update and/or the routing area update process is an inter-system RAI update, so as to obtain a statistics value of the inter-system reselection frequency within the given time period.

Furthermore, the collection module only collects the user logs in which the location area update type is normal location area update type and/or the routing area update type is normal routing area update type; and if a user log contains the routing area update information and the location area update information simultaneously, the frequency statistics module calculates the statistics value of the inter-system reselection frequency only based on the location area update information.

Furthermore, the method for the frequency statistics module to calculate the times of inter-system reselection in the user log in which the location area update process is the inter-system LAI update and/or the routing area update process is the inter-system RAI update comprises:

the frequency statistics module retrieving in an inter-system network format comparison table a system network format corresponding to the call origination cell home LAI in the user log and a system network format corresponding to the original LAI before update in the location area update information respectively, and judging whether the two corresponding system network formats are the same, and if no, accumulating the statistics value of the inter-system reselection frequency; and/or the frequency statistics module retrieving in the inter-system network format comparison table a system network format corresponding to the call origination cell home RAI in the user log and a system network format corresponding to the original RAI before update in the routing area update information respectively, and judging whether the two corresponding system network formats are the same, and if no, accumulating the statistics value of the inter-system reselection frequency.

Furthermore, the frequency statistics module is further configured to calculate the statistics value of the inter-system reselection frequency within the given time period for each user, and generate a statistics result record for the each user; and if the statistics value of the inter-system reselection frequency within the given time period of a user exceeds a preset different alert threshold, provide a corresponding expert prompt in the statistics result record.

Furthermore, the device further comprises:

a classification statistics module, configured to carry out multi-dimensional classification statistics calculation, according to key words of cell, cell group, terminal type, user group or time period, and based on the user logs of the whole network users, collected by the collection module, in which the call process is the location area update and/or the routing area update process, and the statistics result record generated by the frequency statistics module.

In the present invention, in the situation that the 2G and 3G networks are deployed as different location areas at the initial stage of network construction, the data is collected based on the radio network control system, the location area or routing area update log of the UE is calculated and analyzed. Multi-dimensional classification is carried out by the signaling monitoring and analysis system at the network side. The distribution of the inter-system frequency reselections of dual-mode user equipment during the 3G network construction is reflected in the statistics of the calculation results, so as to direct the network area coverage deployment and network convergence construct planning and to improve user experience.

DETAILED DESCRIPTION OF EMBODIMENTS

First, the implementation principles and basic concepts of the present invention will be described.

A radio network controller (RNC) is used as an intermediate link of the system equipment at the network side, and is responsible for the management and allocation of Uu interface (interface between RNC and UE) radio resources and the terrestrial transmission bearer resources of Iub (interface between RNC and NodeB), Iu (interface between RNC and core network (CN)) and Iur interfaces (interface between RNC and RNC). The RNC can record and track the signaling and data bearer establishment and transmission process of the user call process in the network. The RNC is oriented to different types of user terminals in the whole network. Therefore, data collection can be carried out by the RNC, and the signaling monitoring and analysis system at the network side processes the collected data, so as to locate problems of the system equipment, user equipment and radio environment coverage at the network side rapidly and accurately.

The basic concept of the present invention is as follows: the RNC collects user logs, the signaling monitoring and analysis system at the network side calculates the statistics of and analyzes the user logs. Based on the situation where the 2G and 3G networks are planned as different location areas at the initial stage of network construction, whether the user makes inter-system reselection can be judged according to whether the network formats corresponding to the LAI or RAI before and after the user updates the location area. The statistics of the inter-system reselection frequency is calculated so as to reflect the probability distribution of inter-system reselection frequency in a certain area and to direct the planning and construction of network deployment and network convergence.

Hereinafter, the implementation of the technical solution will be further described in detail in conjunction with the drawings.

Figure 1:
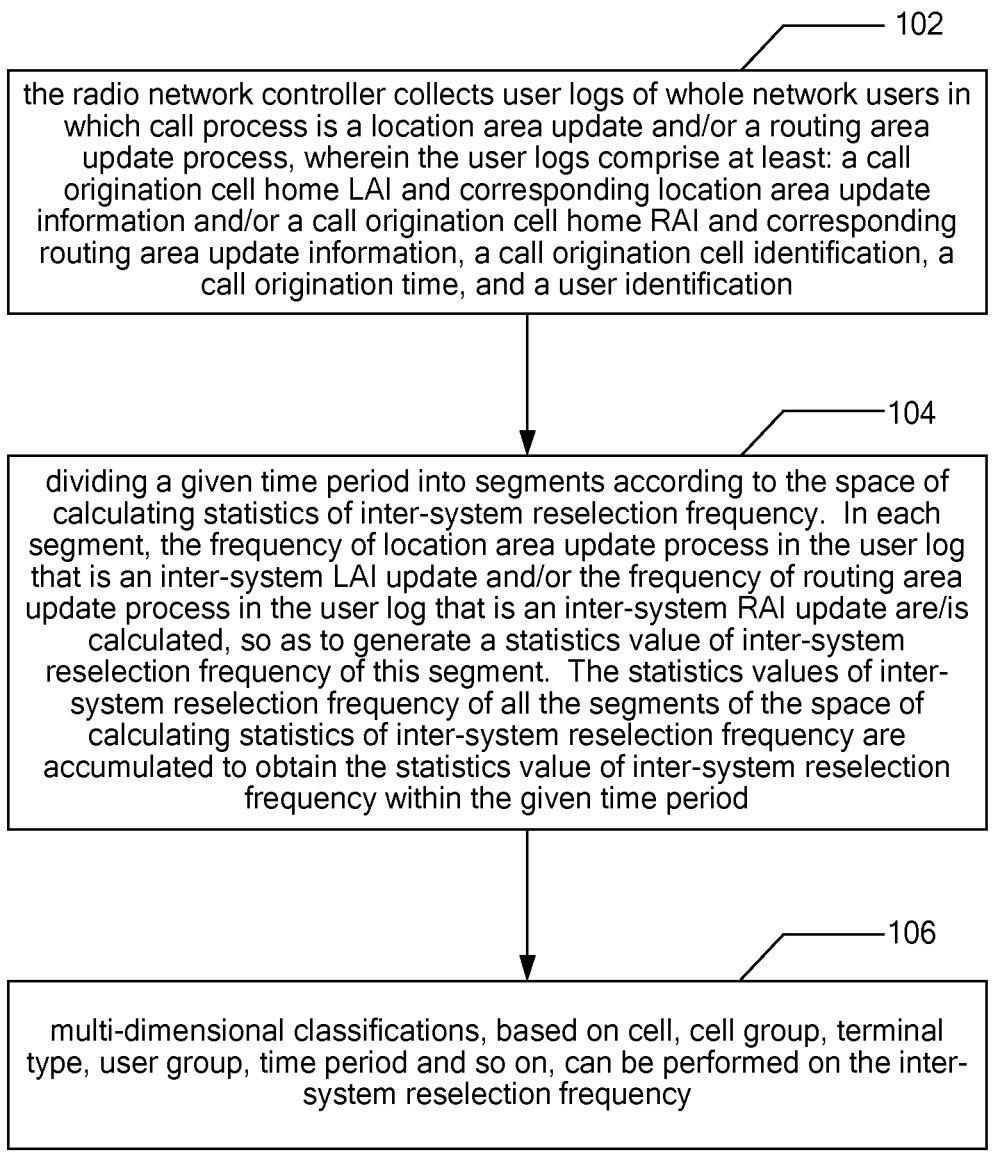
FIG. 1 is a schematic flowchart of a method for calculating statistics of inter-system reselection frequency according to the present invention.

FIG. 1 is a schematic flowchart of a method for calculating statistics of inter-system reselection frequency according to the present invention. The method comprises the following steps.

Step 102, the radio network controller collects user logs of whole network users in which call process is a location area update and/or a routing area update process, wherein the user logs comprise at least: a call origination cell home location area identification (LAI) and corresponding location area update information and/or a call origination cell home routing area identification (RAI) and corresponding routing area update information, a call origination cell identification, a call origination time, and a user identification.

In this case, the location area update information carries location area update type and original LAI before update. The location area update type includes three types of: normal location area update, periodic location area update and international mobile subscriber identity (IMSI) attachment location area update; and the routing area update information carries routing area update type and original RAI before update. The routing area update type includes three types of: normal routing area update, periodic routing area update and IMSI attachment routing area update.

Preferably, the RNC only collects the user logs in which the location area update type is normal location area update type and/or the routing area update type is normal routing area update type.

In this case, the call origination cell identification refers to the identification of the serving cell when the user's call accesses.

In this case, the user identification contains IMSI, international mobile equipment identity (IMEI), etc.

In this case, the call origination time refers to the time when the RNC receives the radio resource control (RRC) connection request sent by the UE.

Preferably, the radio network controller supports the decoding of the non-access-layer location area update message and/or the non-access-layer routing area update message, and obtains and stores the location area update information and routing area update information.

Step 104, dividing a given time period into segments according to the space of calculating statistics of inter-system reselection frequency. In each segment, the times of location area update process in the user log that is an inter-system LAI update and/or the frequency of routing area update process in the user log that is an inter-system RAI update are/is calculated, so as to generate a statistics value of inter-system reselection frequency of this segment. The statistics values of inter-system reselection frequency of all the segments of the space of calculating statistics of inter-system reselection frequency are accumulated to obtain the statistics value of inter-system reselection frequency within the given time period.

In this case, the space of calculating statistics of inter-system reselection frequency refers to the duration in which inter-system reselection is not allowed to appear.

In this case, the method for identifying inter-system LAI update is as follows: retrieving in the inter-system network format comparison table the system network format corresponding to the call origination cell home LAI in the user log and the system network format corresponding to the original LAI before update in the location area update information respectively, and if the two corresponding system network formats are different, then it is deemed that the location area update process in the user log is an inter-system LAI update.

In this case, the method for identifying inter-system RAI update is as follows: retrieving in the inter-system network format comparison table the system network format corresponding to the call origination cell home RAI in the user log and the system network format corresponding to the original RAI before update in the routing area update information respectively, and if the two corresponding system network formats are different, then it is deemed that the routing area update process in the user log is an inter-system RAI update.

In this case, the inter-system network format comparison table to which the LAI or RAI belongs is maintained and managed by the signaling monitoring and analysis system at the network side.

Preferably, when the user log contains packet domain routing area update information and circuit domain location area update information simultaneously, the statistics value of the inter-system reselection frequency is obtained by calculation based on the circuit domain location area update information only.

Preferably, in this step, the calculating of statistics of inter-system reselection frequency within the given time period and the calculating of statistics of inter-system reselection frequency within the segment of the space of calculating statistics of inter-system reselection frequency are carried out for each user. A statistics result record is generated for each user, wherein the statistics result record at least includes user identification and the statistics values of inter-system reselection frequency within the given time period and within the segment of the space of calculating statistics of inter-system reselection frequency. The statistics result record is used for subsequent classification statistics calculation.

Step 106, carrying out multi-dimensional classification statistics calculation, according to key words of cell, cell group, terminal type, user group or time period, and based on the user logs of the whole network users, collected by the RNC, in which the call process is the location area update and/or the routing area update process, and the statistics result record generated in Step 104, so as to obtain the probability distribution of inter-system reselection frequency based on network area, user equipment type or time interval, and to direct an alert prompt of network deployment optimization and terminal performance optimization.

In this case, the user equipment type is based on the first eight digits of IMEI in the user identification, which digits contain TAC (Type Approval Code) and FAC (Final Assembly Code) information so as to indicate the type identity of the user equipment.

Figure 2:
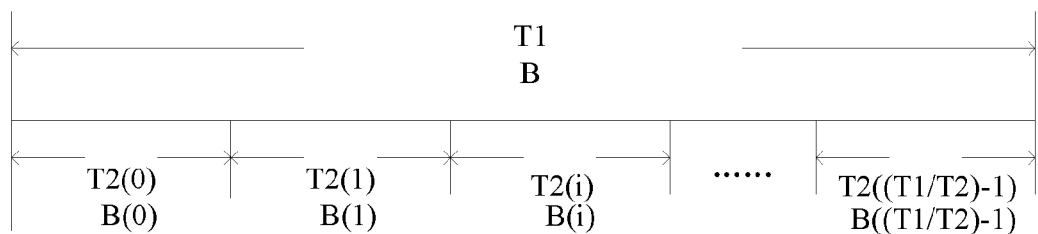
FIG. 2 is a schematic flowchart of a method for calculating statistics of inter-system reselection frequency according to the embodiment of the present invention.

FIG. 2 is a schematic flowchart of a method for calculating statistics of inter-system reselection frequency according to the embodiment of the present invention, which mainly comprises the following steps.

Step 201, the RNC collects the user logs of users of the whole network in which the call process is a location area update process or a routing area update process.

In the present invention, the generated user log contains: call origination cell home LAI and RAI, routing area update information and location area update information, call origination cell, call origination time and user identification.

In the 3G network, the UE originates a call towards the network side to initiate a radio resource control (RRC) connection request. The RNC supports the standard signaling decoding of non-access-layer location area update messages and/or non-access-layer routing area update messages, and the RNC stores location area update and routing area update information.

Both the call origination cell home LAI and RAI are the home LAI and RAI of the serving cell when the UE is directed to establish an RRC connection request with the radio network.

The identification information of the UE can be one of the following identifications: user telephone number, international mobile subscriber identity (IMSI), international mobile equipment identity (IMEI), radio network temporary identification (U-RNTI), cell radio network temporary identification (C-RNTI), packet domain temporary mobile subscriber identity (P-TMSI) and temporary mobile subscriber identity (TMSI). As to P-TMSI and TMSI, the identification information of the UE may contain only one of the two.

Step 202, the signaling monitoring and analysis system at the network side carries out the initialization before calculating the statistics of inter-system reselection frequency of the user, sets the time period T1 of calculating the statistics of inter-system reselection frequency, the space T2 of calculating the statistics of inter-system reselection frequency, the alert threshold or interval of inter-system reselection frequency, and a counter B for T1 and a counter B(i) for each statistics space, and initializes the above variable parameters.

The signaling monitoring and analysis system at the network side supports and maintains the inter-system network format comparison table to which the location area or routing area belongs. The inter-system network format comparison table is used for retrieving different inter-system network formats to which the LAI or RAI belongs.

The time period T1 of calculating the statistics of inter-system reselection frequency is set, and is divided into segments according to the space T2 of calculating the statistics of inter-system reselection frequency. For example, the time unit of T1 can be day.

Figure 3:
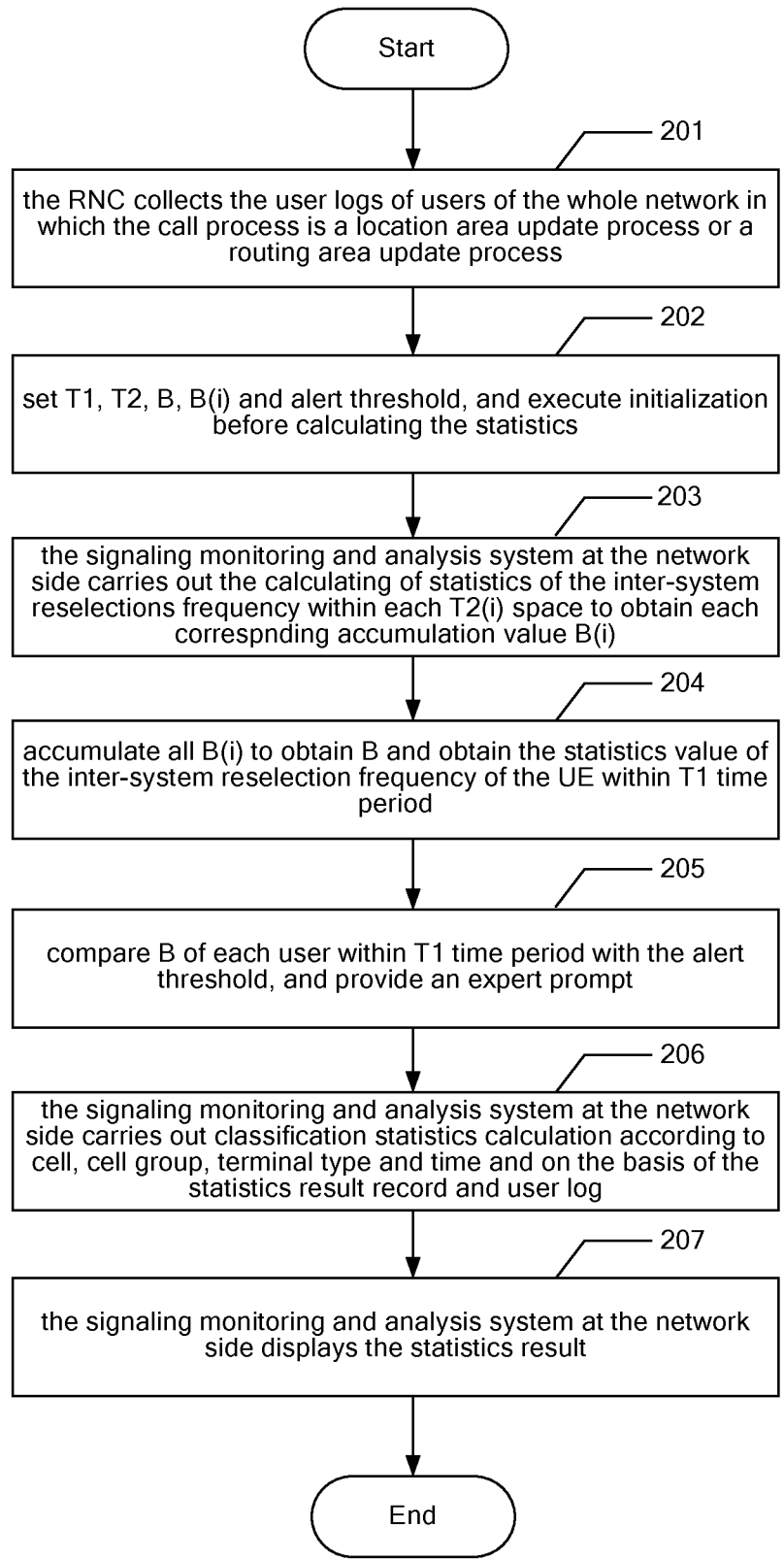
FIG. 3 is a schematic diagram of an algorithm for calculating statistics of reselection frequency according to the present invention.

As shown in FIG. 3, a given time period T1 is set and is divided into segments according to the space T2, wherein T2 refers to the duration in which inter-system reselection is not allowed to appear and T1 is an integral multiplication of T2.

An alert threshold T3 or interval T3–T4 of inter-system reselection frequency of the user is set. For different alert thresholds or alert threshold intervals, when the accumulation value of inter-system reselection frequency of an individual user within the T1 or T2 statistics time period exceeds an alert threshold or falls into an alert threshold interval, an expert prompt will be provided in the statistics result record. The expert prompt can be: the number is normal, high, or too high.

A counter B of inter-system reselection frequency of the user is set for T1, and a counter B(i) of inter-system reselection frequency of the user is set for each T2 space, i=0, . . . ((T1/T2)–1). All of these counters are initialized as 0 at the beginning of calculating the statistics.

Step 203, the signaling monitoring and analysis system at the network side selects each T2(i) space within the T1 time period. After the first user log record within each T2(i) is generated according to the user log in the network, if m times of normal location area update process occurrence in the user log are retrieved, wherein the call origination cell home LAI and the original LAI in the location area update information belong to different system network formats, then the counter B(i) of inter-system reselection frequency of the user within T2(i) is m. Likewise, if a user log in which n times of normal routing area update process occurrence are retrieved, wherein the call origination cell home RAI and the original RAI in the routing area update information belong to different system network formats, then the counter B(i) of inter-system reselection frequency of the user within T2(i) is n.

If the user log contains packet domain routing area update information and circuit domain location area update information simultaneously, the statistics of inter-system reselection frequency is calculated according to the circuit domain location area update information only. That is. if m times of normal location area updates and n times of normal routing area updates are retrieved within T2(i) time period, then the counter B(i) of inter-system reselection frequency of the user within T2(i) shall be less than or equal to m+n.

In this step, the signaling monitoring and analysis system at the network side circularly carries out the calculating of statistics of inter-system reselection frequency within each T2(i) space, and the cycle is ended when i=((T1/T2)–1).

Step 204, the ((T1/T2)–1) counters B(i) within all the T2 space are accumulated to be the counter B, so as to obtain the statistics value of inter-system reselection frequency of the UE within T1 time period.

Step 205, the counter B of each user within T1 time period is compared with T3, or it is judged whether the counter B of each user within T1 time period falls into interval T3–T4. If the counter B is greater than T3 or falls into T3–T4, then an expert prompt will be provided and a corresponding statistics result record will be generated, wherein the statistics result record at least contains user identification, the statistics value of inter-system reselection frequency within each T2 space and/or the statistics value of inter-system reselection frequency within T1 time period.

Step 206, the signaling monitoring and analysis system at the network side can carry out classification statistics calculation according to cell, cell group, terminal type and time and based on the above statistics result record and the user log. The IMEI reflects the terminal model number and the manufacture. Therefore, from many different angles, the classification statistics calculation can reflect the irrationality of network area coverage that causes the area or user equipment performance being abnormal and frequent inter-system reselection.

Step 207, the signaling monitoring and analysis system at the network side displays the statistics result.

Figure 4:
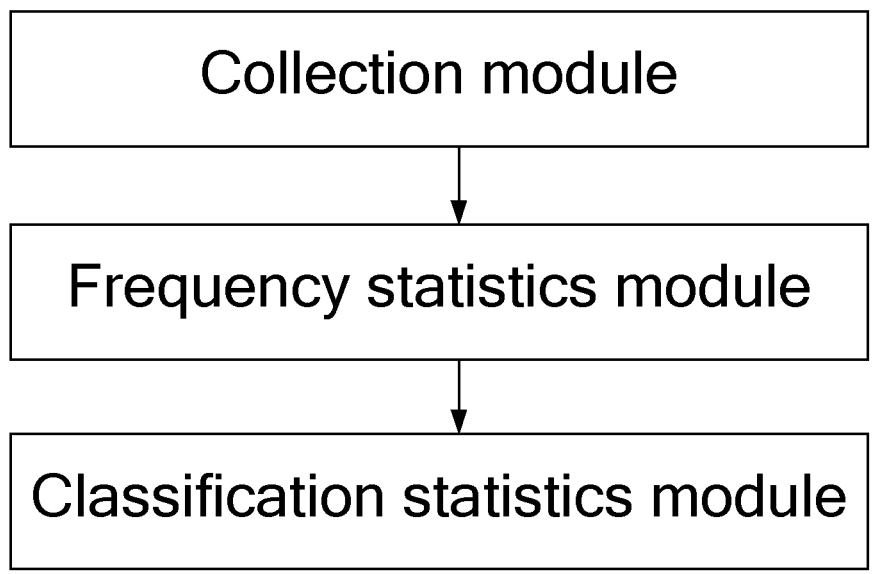
FIG. 4 is a schematic diagram of the logic structure of a device for calculating statistics of inter-system reselection frequency according to the present invention.

Based on the above method, a device for calculating statistics of inter-system reselection frequency is provided in the present invention. As shown in FIG. 4, the device comprises: a collection module, a frequency statistics module, and a classification statistics module. The specific description is given below.

The collection module, located at an RNC, is configured to collect user logs of whole network users in which call process is a location area update and/or a routing area update process, wherein the user logs comprise at least: a call origination cell home location area identification (LAI) and corresponding location area update information and/or a call origination cell home routing area identification (RAI) and corresponding routing area update information, a call origination cell identification, a call origination time, and a user identification; the location area update information carries a location area update type and an original LAI before update; and the routing area update information carries a routing area update type and an original RAI before update, and the frequency statistics module, located in a signaling monitoring and analysis system, is configured to, within a given time period, calculate times of inter-system reselection in a user log in which the location area update process is an inter-system LAI update and/or the routing area update process is an inter-system RAI update, so as to obtain a statistics value of the inter-system reselection frequency within the given time period.

Furthermore, the collection module only collects the user logs in which the location area update type is normal location area update type and/or the routing area update type is normal routing area update type, so as to save the space occupied for storing user logs in the RNC and improve collection efficiency; and furthermore, if a user log contains routing area update information and location area update information simultaneously, the frequency statistics module calculates the statistics value of the inter-system reselection frequency only based on the location area update information.

Furthermore, the frequency statistics module calculates the times of inter-system reselection in the user log in which the location area update process is the inter-system LAI update and/or the routing area update process is the inter-system RAI update according to the following method:

the frequency statistics module retrieves in an inter-system network format comparison table a system network format corresponding to the call origination cell home LAI in the user log and a system network format corresponding to the original LAI before update in the location area update information respectively, and judges whether the two corresponding system network formats are the same, and if no, accumulates the statistics value of the inter-system reselection frequency; and/or the frequency statistics module retrieves in the inter-system network format comparison table a system network format corresponding to the call origination cell home RAI in the user log and a system network format corresponding to the original RAI before update in the routing area update information respectively, and judges whether the two corresponding system network formats are the same, and if no, accumulates the statistics value of the inter-system reselection frequency.

The frequency statistics module is further configured to calculate statistics of inter-system reselection frequency within the given time period for each user and generate a statistics result record for each user; and if the statistics value of inter-system reselection frequency within the given time period of a user exceeds a preset different alert threshold, provide a corresponding expert prompt in the statistics result record.

The classification statistics module, located in the signaling monitoring and analysis system, is configured to carry out multi-dimensional classification statistics calculation, according to key words of cell, cell group, terminal type, user group or time period, and based on both the user logs of the whole network users, collected by the collection module, in which the call process is the location area update and/or the routing area update process, and the statistics result record generated by the frequency statistics module.

In the present invention, the RNC collects the user logs of call process of whole network users. The signaling monitoring and analysis system carries out classification statistics calculation from multiple dimensions according to the statistics algorithm in the present invention, and obtains the probability distribution trends of the inter-system reselection frequency based on network area or user equipment type within a certain statistics period. This solution can provide an alert prompt for network deployment optimization and terminal performance optimization. As compared to data collection and analysis based on the core network, in the present invention the analysis granularity can reach the cell level, which is more advantageous for directing network area coverage deployment and network convergence construction planning and for improving user experience.

The description above is only preferred embodiments of the present invention, and should not be used to limit the scope of protection of the present invention.

What is claimed is:

1. A method for calculating statistics of inter-system reselection frequency, comprising:
a radio network controller (RNC) collecting user logs of whole network users in which call process is a location area update and/or a routing area update process, wherein the user logs comprise at least: a call origination cell home location area identification (LAI) and corresponding location area update information and/or a call origination cell home routing area identification (RAI) and corresponding routing area update information, a call origination cell identification, a call origination time, and a user identification; wherein the location area update information carries a location area update type and an original LAI before update, and the routing area update information carries a routing area update type and an original RAI before update; and
within a given time period, calculating times of inter-system reselection in a user log in which the location area update process is an inter-system LAI update and/or the routing area update process is an inter-system RAI update, so as to obtain a statistics value of the inter-system reselection frequency within the given time period.

2. The method according to claim 1, wherein the RNC supports decoding of a non-access-layer location area update message and/or a non-access-layer routing area update message.

3. The method according to claim 1, wherein the RNC only collects the user logs in which the location area update type is normal location area update type and/or the routing area update type is normal routing area update type.

4. The method according to claim 1, wherein when a user log contains the routing area update information and the location area update information simultaneously, the statistics value of the inter-system reselection frequency is calculated only based on the location area update information.

5. The method according to claim 1, wherein calculating the times of inter-system reselection in the user log in which the location area update process is the inter-system LAI update and/or the routing area update process is the inter-system RAI update comprises:
  retrieving in an inter-system network format comparison table a system network format corresponding to the call origination cell home LAI in the user log and a system network format corresponding to the original LAI before update in the location area update information respectively; and when the two corresponding system network formats are different, accumulating the statistics value of the inter-system reselection frequency; and/or
  retrieving in the inter-system network format comparison table a system network format corresponding to the call origination cell home RAI in the user log and a system network format corresponding to the original RAI before update in the routing area update information respectively, and when the two corresponding system network formats are different, accumulating the statistics value of the inter-system reselection frequency.

6. The method according to claim 1, further comprising:
  calculating the statistics value of the inter-system reselection frequency within the given time period for each user, and generating a statistics result record for the each user; and
  when the statistics value of the inter-system reselection frequency within the given time period of a user exceeds a preset different alert threshold, providing a corresponding expert prompt in the statistics result record.

7. The method according to claim 6, further comprising:
  carrying out multi-dimensional classification statistics calculation, according to key words of cell, cell group, terminal type, user group or time period, and based on both the user logs of the whole network users, collected by the RNC, in which the call process is the location area update and/or the routing area update process, and the statistics result record.

8. A device for calculating statistics of inter-system reselection frequency, comprising a hardware processor which is configured to execute following modules:
  a collection module, located in a radio network controller (RNC), configured to collect user logs of whole network users in which call process is a location area update and/or a routing area update process, wherein the user logs comprise at least: a call origination cell home location area identification (LAI) and corresponding location area update information and/or a call origination cell home routing area identification (RAI) and corresponding routing area update information, a call origination cell identification, a call origination time, and a user identification; wherein the location area update information carries a location area update type and an original LAI before update, and the routing area update information carries a routing area update type and an original RAI before update; and
  a frequency statistics module, configured to, within a given time period, calculate times of inter-system reselection in a user log in which the location area update process is an inter-system LAI update and/or the routing area update process is an inter-system RAI update, so as to obtain a statistics value of the inter-system reselection frequency within the given time period.

9. The device according to claim 8, wherein the collection module only collects the user logs in which the location area update type is normal location area update type and/or the routing area update type is normal routing area update type; and
  when a user log contains the routing area update information and the location area update information simultaneously, the frequency statistics module calculates the statistics value of the inter-system reselection frequency only based on the location area update information.

10. The device according to claim 8, wherein the method for the frequency statistics module to calculate the times of inter-system reselection in the user log in which the location area update process is the inter-system LAI update and/or the routing area update process is the inter-system RAI update comprises:
  the frequency statistics module retrieving in an inter-system network format comparison table a system network format corresponding to the call origination cell home LAI in the user log and a system network format corresponding to the original LAI before update in the location area update information respectively, and judging whether the two corresponding system network formats are the same, and when the two corresponding system network formats are not the same, accumulating the statistics value of the inter-system reselection frequency; and/or
  the frequency statistics module retrieving in the inter-system network format comparison table a system network format corresponding to the call origination cell home RAI in the user log and a system network format corresponding to the original RAI before update in the routing area update information respectively, and judging whether the two corresponding system network formats are the same, and when the two corresponding system network formats are not the same, accumulating the statistics value of the inter-system reselection frequency.

11. The device according to claim 8, wherein the frequency statistics module is further configured to calculate the statistics value of the inter-system reselection frequency within the given time period for each user, and generate a statistics result record for the each user; and when the statistics value of the inter-system reselection frequency within the given time period of a user exceeds a preset different alert threshold, provide a corresponding expert prompt in the statistics result record.

12. The device according to claim 11, further comprising:
  a classification statistics module, configured to carry out multi-dimensional classification statistics calculation, according to key words of cell, cell group, terminal type, user group or time period, and based on the user logs of the whole network users, collected by the collection module, in which the call process is the location area update and/or the routing area update process, and the statistics result record generated by the frequency statistics module.

13. The method according to claim 2, wherein when a user log contains the routing area update information and the location area update information simultaneously, the statistics value of the inter-system reselection frequency is calculated only based on the location area update information.

14. The method according to claim 3, wherein when a user log contains the routing area update information and the location area update information simultaneously, the statistics value of the inter-system reselection frequency is calculated only based on the location area update information.

* * * * *